US010536285B2

(12) United States Patent
Nagarajan et al.

(10) Patent No.: US 10,536,285 B2
(45) Date of Patent: Jan. 14, 2020

(54) MULTICAST JOIN MESSAGE PROCESSING BY MULTI-HOMING DEVICES IN AN ETHERNET VPN

(71) Applicant: Juniper Networks, Inc., Sunnyvale, CA (US)

(72) Inventors: Vikram Nagarajan, Bangalore (IN); Zhaohui Zhang, Westford, MA (US); Princy T. Elizabeth, Bangalore (IN); Ragupathi J, Trichy (IN)

(73) Assignee: Juniper Networks, Inc., Sunnyvale, CA (US)

( * ) Notice: Subject to any disclaimer, the term of this patent is extended or adjusted under 35 U.S.C. 154(b) by 11 days.

(21) Appl. No.: 15/880,370

(22) Filed: Jan. 25, 2018

(65) Prior Publication Data
US 2019/0229937 A1 Jul. 25, 2019

(51) Int. Cl.
*H04L 12/18* (2006.01)
*H04L 12/46* (2006.01)
(Continued)

(52) U.S. Cl.
CPC .......... *H04L 12/18* (2013.01); *H04L 12/4641* (2013.01); *H04L 45/12* (2013.01); *H04L 69/324* (2013.01)

(58) Field of Classification Search
CPC ........ H04W 80/04; H04W 8/26; H04L 12/56; H04L 2012/56; H04L 45/02; H04L 45/04;
(Continued)

(56) References Cited

U.S. PATENT DOCUMENTS

| 8,761,171 B1 * | 6/2014 | Zhang | ................. H04L 12/1886 370/390 |
| 2012/0063465 A1 * | 3/2012 | Keesara | ............. H04L 12/4633 370/401 |

(Continued)

FOREIGN PATENT DOCUMENTS

| EP | 3070877 A1 | 9/2016 |
| EP | 3264690 A1 | 1/2018 |

OTHER PUBLICATIONS

"PIM Sparse Mode Source Registration," Multicast Protocols on the OCX Series, TechLibrary, Junos OS, accessed from https://www.juniper.net/documentation/en_US/junos/topics/concept/multicast-pim-sparse-mode-registration.html, modified Aug. 31, 2017, 3 pp.

(Continued)

*Primary Examiner* — Brenda H Pham
(74) *Attorney, Agent, or Firm* — Shumaker & Sieffert, P.A.

(57) ABSTRACT

In some examples, a method includes receiving, by a first provider edge (PE) device of a layer 3 network, configuration data configuring the PE device to provide, via an Ethernet segment with an edge device, active-active multi-homing layer 2 (L2) virtual bridge connectivity to the edge device using an Ethernet Virtual Private Network (EVPN) instance; receiving, by the first PE device, a multicast Join message for multicast traffic, the multicast Join message identifying a second PE device that also participates in the EVPN instance; processing, by the first PE device, the multicast Join message to generate multicast forwarding state; and forwarding, by the first PE device based at least on the multicast forwarding state, the multicast traffic.

26 Claims, 4 Drawing Sheets

(51) Int. Cl.
  *H04L 29/08* (2006.01)
  *H04L 12/721* (2013.01)
(58) Field of Classification Search
  CPC ..... H04L 45/10; H04L 12/66; H04L 2012/46;
    H04L 2012/5618; H04L 12/46; H04L
    12/4625; H04L 12/462; H04L 12/40097;
    H04L 12/40091; H04L 65/00; H04L
    45/00; H04L 12/18; H04L 12/185; H04L
    45/16; H04L 49/201; H04L 49/10; H04L
    49/15; H04L 29/06163; H04L 45/50;
    H04L 2012/5665; H04L 12/5601
  USPC ....... 370/349, 389, 400, 401, 402, 351, 390,
    370/386, 395.5, 395.53, 312
  See application file for complete search history.

(56) References Cited

U.S. PATENT DOCUMENTS

| | | | | |
|---|---|---|---|---|
| 2013/0148657 | A1* | 6/2013 | Salam | H04L 45/66 370/390 |
| 2016/0021015 | A1* | 1/2016 | Thoria | H04L 47/2483 370/235 |
| 2016/0119156 | A1* | 4/2016 | Drake | H04L 45/16 709/223 |
| 2017/0230277 | A1* | 8/2017 | Ranns | H04L 45/18 |
| 2018/0034648 | A1* | 2/2018 | Nagarajan | H04L 67/1038 |
| 2018/0077050 | A1* | 3/2018 | Tiruveedhula | H04L 12/4641 |
| 2018/0131619 | A1* | 5/2018 | Hao | H04L 47/125 |
| 2018/0367451 | A1* | 12/2018 | Gulrajani | H04L 45/16 |

OTHER PUBLICATIONS

"SPT Cutover," Multicast Protocols on OCX Series, TechLibrary, Junos OS, accessed from https://www.juniper.net/documentation/en_US/junos/topics/concept/multicast-pim-spt-cutover.html, modified Aug. 31, 2017, 5 pp.

Fenner et al., "Protocol Independent Multicast—Sparse Mode (PIM-SM): Protocol Specification (Revised)," RFC 7761, Internet Engineering Task Force (IETF), Mar. 2016, 137 pp.

Sajassi et al., "BGP MPLS-Based Ethernet VPN," RFC 7432, Internet Engineering Task Force (IETF), Feb. 2015, 56 pp.

Sajassi et al., "Integrated Routing and Bridging in EVPN, draft-ietf-bess-evpn-inter-subnet-forwarding-01," Internet-Draft, L2VPN Workgroup, Oct. 18, 2015, 26 pp.

Yong et al., "Network Virtualization Edge (NVE), draft-yong-nvo3-nve-03," Internet-Draft, Network Working Group, Feb. 13, 2014, 20 pp.

Rosen et al., BGP/MPLS IP Virtual Private Networks (VPNs), RFC 4364, Network Working Group, Feb. 2006, 47 pp.

Extended Search Report from counterpart European Application No. 18203755.6, dated Apr. 24, 2019, 9 pp.

* cited by examiner

MULTICAST JOIN MESSAGE PROCESSING BY MULTI-HOMING DEVICES IN AN ETHERNET VPN

TECHNICAL FIELD

The disclosure relates to computer networks and, more particularly, to routing packets within computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

Using multicasting, a network distributes multicast packets to a set of interested receivers that can be on different subnetworks and that are configured as members of a multicast group. Protocol Independent Multicast (PIM) is one example of a protocol for creating multicast distribution trees in the network for distributing packets. PIM is described in further detail in "Protocol Independent Multicast-Sparse Mode (PIM-SM): Protocol Specification (Revised)," March 2016, Internet Engineering Task Force, Request for Comments (RFC) 7761, which is incorporated by reference herein in its entirety.

In some examples, the network that distributes multicast packets may include an Ethernet Virtual Private Network (EVPN), which may be used to extend two or more layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via traffic engineered label switched paths (LSP) through the intermediate network in accordance with one or more multiprotocol label switching (MPLS) protocols. In a typical configuration, provider edge (PE) devices (e.g., routers and/or switches) coupled to the customer edge (CE) network devices of the customer networks define label switched paths (LSPs) within the provider network to carry encapsulated L2 communications as if these customer networks were directly attached to the same local area network (LAN). In some configurations, the PE devices may also be connected by an IP infrastructure in which case IP/GRE tunneling or other IP tunneling can be used between the network devices.

In an EVPN, L2 address learning (also referred to as "MAC learning") in a PE device occurs in the control plane rather than in the data plane (as happens with traditional bridging) using a routing protocol. For example, in EVPNs, a PE device typically uses the Border Gateway Protocol (BGP) (i.e., an L3 routing protocol) to advertise to other provider edge network devices the MAC addresses learned from the local consumer edge network devices to which the PE device is connected. A PE device may use BGP route advertisement messages to announce reachability information for the EVPN, where the BGP route advertisements specify one or more MAC addresses learned by the PE device instead of L3 routing information.

In an EVPN configuration referred to as the active-active EVPN multi-homing mode of operation, an Ethernet segment includes multiple PE devices that provide multi-homed connectivity for one or more local customer edge (CE) devices. Moreover, the multiple PE device provide transport services through the intermediate layer 3 network to a remote PE device, and each of the multiple PE devices in the Ethernet segment forwards Ethernet frames in the segment for the CE device. In the active-active EVPN multi-homing mode of operation, all active PE devices of the multi-homing PE devices are allowed to concurrently forward traffic to and from an Ethernet segment that make up the set of L2 links connecting the multi-homed CE device with the multi-homing PE devices. Additional example information with respect to EVPN is described in "BGP MPLS-Based Ethernet VPN," Request for Comments (RFC) 7432, Internet Engineering Task Force (IETF), February, 2015, the entire contents of which are incorporated herein by reference.

To facilitate inter-subnet forwarding among customer endpoints across different L3 subnets, a PE device may be configured with an EVPN instance that uses an integrated routing and bridging (IRB) interface to locally perform L3 routing of inter-subnet traffic rather than via an L3 gateway. A PE device configured with an IRB interface for an EVPN instance may therefore both locally route inter-subnet traffic and bridge intra-subnet traffic. Additional example information with respect to integrated routing and bridging for EVPNs is described in "Integrated Routing and Bridging in EVPN," draft-ietf-bess-evpn-inter-subnet-forwarding-01, L2VPN Workgroup, Oct. 18, 2015, the entire contents of which are incorporated herein by reference. In response to locally learning a L2-L3 binding for a customer endpoint bridged by an EVPN instance, a PE device may advertise the binding using a BGP EVPN route with a BGP Network Layer Reachability Information (NLRI) that indicates the L2 address and L3 address for the customer endpoint are reachable via the PE device. In RFC 7432, this type of BGP EVPN route is referred to as a MAC/IP advertisement route (Type 2).

SUMMARY

In general, techniques are described for creating and using multicast forwarding state for a shortest-path tree in a provider edge (PE) device that receives a multicast Join message for joining the shortest-path tree even when the PE device is not the upstream neighbor specified by the Join message. For example, the PE device may be, along with one or more other multi-homing PE devices, a multi-homing PE device for a multi-homed Ethernet segment of an Ethernet Virtual Private Network (EVPN) instance that connects, over a layer 3 intermediate network, a network having a multicast source for a multicast group to another network reachable by the multi-homed Ethernet segment that is on a shortest path from the multicast source to an interested multicast receiver for the multicast group. In this network configuration, each of the multi-homing PE devices may receive a multicast Join message, e.g., a PIM (S,G) Join message, that requests to join the shortest-path tree for multicast traffic from the multicast source. However, a conventional multicast Join message only specifies one of the multi-homing PE devices as the upstream neighbor that is identified by the message and that is to create the multicast forwarding state for the shortest-path tree.

If the specified upstream neighbor is not the designated forwarder PE device ("the non-DF PE device") for broadcast, unidentified unicast, and multicast (BUM) traffic for the multi-homed Ethernet segment, conventional processing of the multicast Join message does not produce the intended result. That is, the downstream devices do not receive multicast traffic on the shortest-path tree for the multicast traffic, for the non-DF PE device, although it may create the multicast forwarding state, is not the designated forwarder for the Ethernet segment and therefore does not forward any of the multicast traffic that it receives from the multicast source. Consequently, the RP router may not receive the multicast traffic other than via unicast PIM Register messages, may therefore be unable to send a PIM Register-Stop message, and the designated router for the multicast source may therefore be unable to discontinue using the PIM Register messages to send the multicast traffic to the RP router. In addition, shortest-path tree switchover (or "cutover") may be inhibited and the routers may be unable to discontinue using the rendezvous-point (RP) tree ("RP tree" or RPT) for the multicast traffic.

A multi-homing PE device operating according to techniques described herein is configured to install multicast forwarding state for the shortest-path tree in response to receiving a multicast Join message, even if the PE device is not identified by the multicast Join message. As a result, the techniques described herein provide technical solutions in which the designated forwarder PE device for a multi-homed Ethernet segment that receives such a multicast Join message installs the multicast forwarding state and, being the designated forwarder, also forwards the multicast traffic along the shortest-path tree toward the receiver.

The techniques may provide one or more technical advantages. For example, the techniques may enable multicast traffic to be forwarded along a shortest-path tree from the designated router for the multicast source to the RP router. This may cause the RP router to send a PIM Register-Stop message and enable the designated router for the multicast source, which may be one of the multi-homing PE devices for the Ethernet segment, to discontinue using the PIM Register messages to send the multicast traffic to the RP router, which may eliminate the need for a PIM Register tunnel from the multi-homing PE device to the RP router. Because such tunnels are resource-intensive and inject significant latency into multicast traffic delivery, the techniques may provide technical solutions that reduce resource utilization and multicast traffic latency from the multicast source to the multicast receiver. In addition, the techniques may enable the routers of the multicast (e.g., PIM) domain to perform shortest-path tree switchover. Switching to receive the traffic on the shortest-path tree in this way may further reduce latency of the multicast traffic by eliminating reliance on the RPT for forwarding. Because only one of the multi-homing PE device for the Ethernet segment is the designated forwarder, the techniques do not result in multiple copies of the multicast traffic from corresponding multi-homing PE devices.

In some examples, a method includes receiving, by a first provider edge (PE) device of a layer 3 network, configuration data configuring the PE device to provide, via an Ethernet segment with an edge device, active-active multi-homing layer 2 (L2) virtual bridge connectivity to the edge device using an Ethernet Virtual Private Network (EVPN) instance; receiving, by the first PE device, a multicast Join message for multicast traffic, the multicast Join message identifying a second PE device that also participates in the EVPN instance; processing, by the first PE device, the multicast Join message to generate multicast forwarding state; and forwarding, by the first PE device based at least on the multicast forwarding state, the multicast traffic.

In some examples, a network device operable as a first provider edge (PE) device of a layer 3 network includes one or more processors operably coupled to a memory, wherein the one or more processors are configured to receive configuration data configuring the PE device to provide, via an Ethernet segment with an edge device, active-active multi-homing layer 2 (L2) virtual bridge connectivity to the edge device using an Ethernet Virtual Private Network (EVPN) instance, wherein the one or more processors are configured to receive a multicast Join message for multicast traffic, the multicast Join message identifying a second PE device that also participates in the EVPN instance, wherein the one or more processors are configured to process the multicast Join message to generate multicast forwarding state, and wherein the one or more processors are configured to forward, based at least on the multicast forwarding state, the multicast traffic.

In some examples, non-transitory computer-readable medium comprises instructions for causing one or more programmable processors of a provider edge (PE) device of a layer 3 network to: receive configuration data configuring the PE device to provide, via an Ethernet segment with an edge device, active-active multi-homing layer 2 (L2) virtual bridge connectivity to the edge device using an Ethernet Virtual Private Network (EVPN) instance; receive a multicast Join message for multicast traffic, the multicast Join message identifying a second PE device that also participates in the EVPN instance; process the multicast Join message to generate multicast forwarding state; and forward, based at least on the multicast forwarding state, the multicast traffic.

The details of one or more embodiments are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
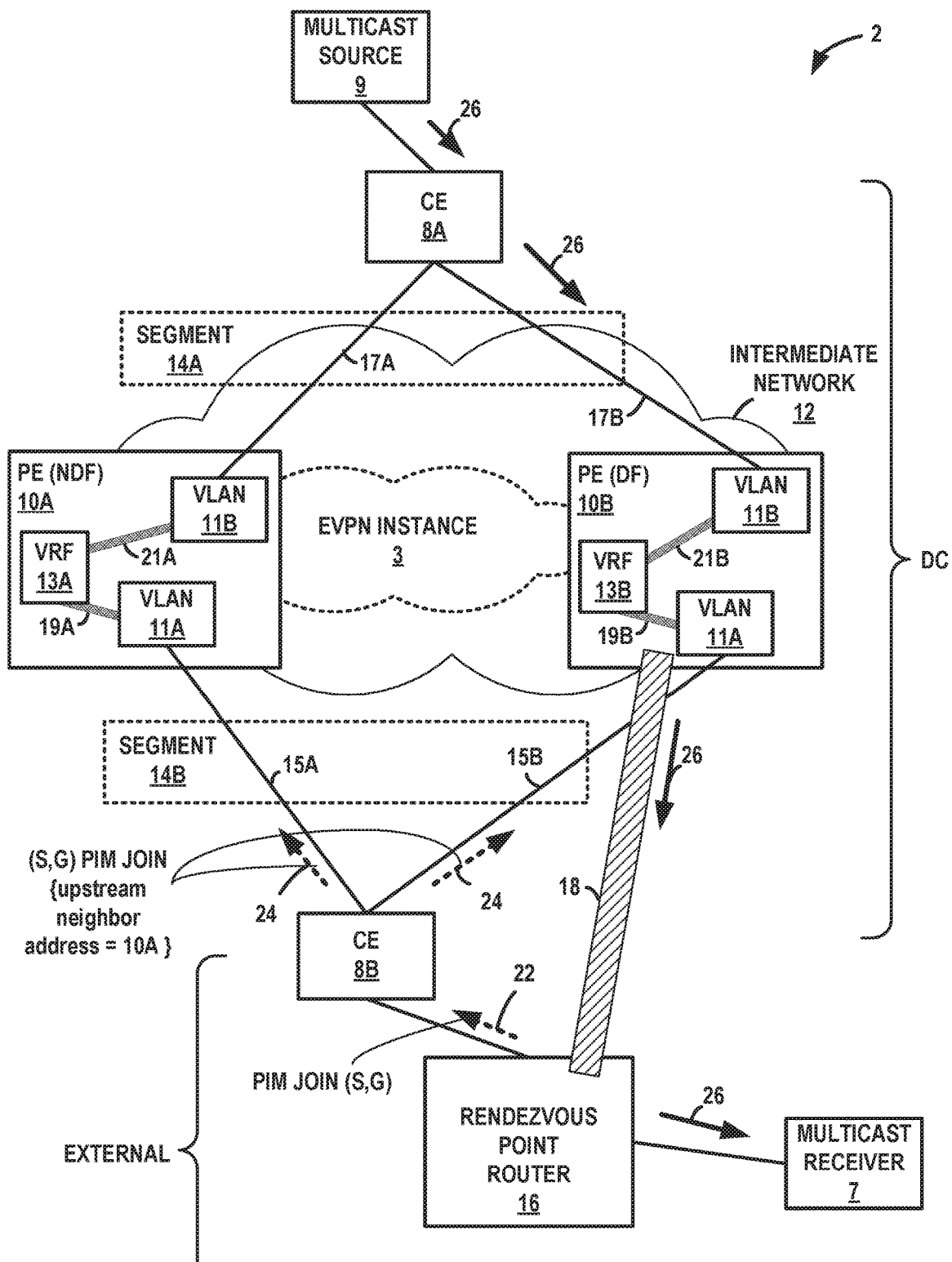
FIG. 1 is a block diagram illustrating an example system, in accordance with techniques of the disclosure.

FIG. 1 is a block diagram illustrating an example network system 2, in accordance with techniques of the disclosure. In the example of FIG. 1, PE devices 10A-10B ("PE devices 10" or, more simply, "PE devices 10") provide devices with access to an intermediate layer 3 (L3) network (here, "intermediate network 12") via customer edge (CE) devices 8A-8B ("CEs 8"). PE devices 10 may each represent a router, switch, aggregation device (AD), or other type of network device capable of performing PE operations for an Ethernet Virtual Private Network (EVPN). Communication links 15, 17 may be Ethernet, ATM or any other suitable network connections.

CEs 8 may each represent a host, router, switch, or other suitable network device that participates in an EVPN. CEs 8 may be edge devices for customer networks, such as geographically or logically separated sites of an enterprise, networks for different customers of the intermediate network 12, or tenants or tenant systems of an intermediate network 12 for a data center. Customer networks may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network system 2 illustrated in FIG. 1 is merely an example. For example, an enterprise may include any number of customer networks.

In the example of FIG. 1, CE 8A is an edge device for a customer network that includes multicast source 9. Multicast source 9 sources multicast traffic 26 for a multicast group and may represent a real or virtual server. CE 8B is an edge device coupled via Ethernet segment 14B to PE devices 10, which provide an EVPN between CE 8A and CE 8B.

Intermediate network 12 may represent a service provider network that is owned and operated by a service provider, which is usually large telecommunications entity or corporation. Intermediate network 12 represents an L3 computer network, where reference to a layer followed by a number refers to a corresponding layer in the Open Systems Interconnection (OSI) model. Intermediate network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the "IP layer" in the TCP/IP model, and the term L3 may be used interchangeably with the and "network layer" and "IP" throughout this disclosure.

Intermediate network 12 may be coupled to one or more networks administered by the provider of intermediate network 12 or other providers, and may thus form part of a large-scale public network infrastructure, e.g., the Internet. In this example, intermediate network is coupled via CE 8B to an external network or networks that includes rendezvous point (RP) router 16 and a multicast receiver 7 that is an interested receiver for multicast traffic 26. Thus, while CE 8B is described as a customer edge device in that an EVPN instance is defined in RFC 7432 to include CE devices that are connected to PE devices that form the edge of the MPLS infrastructure, CE 8B may be, e.g., another type of edge device or gateway router for a data center or other network that includes PE devices and CE 8A. For instance, CE 8B may represents an MX-Series router manufactured by Juniper Networks, Inc and deployed in the manner just described.

Intermediate network 12 may provide computing devices within customer networks of the PE device 10 with access to the Internet, and may allow the computing devices within the customer networks to communicate with each other. In some cases, intermediate network 12 represents a data center L2/L3 switching fabric (or "data center fabric network") that interconnects CEs for tenants of the data center, where a tenant may represent an organization or a logical partitioning of resources, data, and/or applications within the data center.

Intermediate network 12 may include a variety of network devices other than PE devices 10. For instance, intermediate network 12 may include a route reflector, one or more provider routers (also known as "P" or "core" routers), switches, and so forth. In some examples, the route reflector (not shown) may reside within intermediate network 12 and along a path in a service provider network between two or more PE devices. Because of an internal BGP (IBGP) full-mesh requirement, some networks may use route reflectors to simplify configuration. Using a route reflector, routers are grouped into clusters, which are identified by numeric identifiers unique to an autonomous system (AS). Within the cluster, a BGP session is configured from a single router (the route reflector) to each internal peer. With this configuration, the IBGP full-mesh requirement may be met by the route reflector. To use route reflection in an AS, one or more routers are designated as a route reflector—typically, one per point of presence (POP). Route reflectors have the BGP ability to re-advertise routes learned from an internal peer to other internal peers. Rather than requiring all internal peers to be fully meshed with each other, route reflection may have only the route reflector be fully meshed with all internal peers.

Although additional network devices are not shown for ease of explanation, it should be understood that network system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network system 2 are illustrated as being directly coupled, it should be understood that one or more additional network elements may be included along any of the illustrated links 15, 17, such that the network elements of network system 2 are not directly coupled.

Intermediate network 12 may provide a number of residential and business services, including residential and business class data services (which are often referred to as "Internet services" in that these data services permit access to the collection of publicly accessible networks referred to as the Internet), residential and business class telephone and/or voice services, and residential and business class television services. One such business class data service offered by a service provider intermediate network 12 includes L2 EVPN service. Intermediate network 12 that represents an L2/L3 switch fabric for one or more data centers may implement an L2 EVPN service. An EVPN is a service that provides a form of L2 connectivity across an intermediate L3 network, such as intermediate network 12, to interconnect two or more L2 customer networks, such as L2 customer networks 6, that may be located in different geographical areas (in the case of service provider network implementation) and/or in different racks (in the case of a data center implementation). Often, EVPN is transparent to the customer networks in that these customer networks are not aware of the intervening intermediate network and instead act and operate as if these customer networks were directly connected and formed a single L2 network. In a way, EVPN enables a form of a transparent LAN connection between two customer sites that each operates a L2 network and, for this reason, EVPN may also be referred to as a "transparent LAN service."

To configure an EVPN, a network operator of the intermediate network 12 configures, via configuration or management interfaces, various devices included within intermediate network 12 that interface with the customer networks 6. The EVPN configuration may include an EVPN instance (EVI), which consists of one or more broadcast domains. Generally, an EVI may be associated with a virtual routing and forwarding instance (VRF) on a PE device, such as any of PE devices 10A-10B. Consequently, multiple EVIs may be configured on PE devices 10 for Ethernet segments 14, as further described herein, each providing a separate, logical layer two (L2) forwarding domain. In this way, multiple EVIs may be configured that each includes one or more of PE devices 10A-10B. In some examples, Ethernet Tags are then used to identify a particular broadcast domain, e.g., a VLAN, in an EVI. A PE device may advertise an MPLS service label (or "MAC label," "MAC route label," or more simply "label") per-<ESI, Ethernet Tag> combination. This label assignment methodology is referred to as a per-<ESI, Ethernet Tag> label assignment. Alternatively, a PE device may advertise a unique label per MAC address. In still another example, a PE device may advertise the same single label for all MAC addresses in a given EVI. This label assignment methodology is referred to as a per-EVI label assignment. Such labels are advertised by PE devices 10 in EVPN MAC advertisement routes.

An EVPN instance (EVI) 3 is configured within intermediate network 12 to enable computing devices of customer networks of the PE devices 10 to communicate with one another via the EVI as if the computing devices were directly connected via a L2 network or link. In this example, CE 8B is able to communicate with CE 8A configured to use the EVI 3 as if CE 8B and the CE 8A were directly connected via an L2 network or link. As described herein, EVI 3 is an EVPN instance spanning PE devices 10A-10B participating in the EVI 3. Each of PE devices 10 is configured with EVI 3 and exchanges EVPN routes to implement EVI 3.

As part of establishing EVI 3, PE devices 10A-10B may trigger EVPN designated forwarder (DF) election for EVI 3 for multi-homed Ethernet segment 14B. This may be done, for example, by the PE devices 10A-10B connective to Ethernet segment 14B outputting EVPN routes advertising an Ethernet Segment Identifier (ESI) for Ethernet segment 14B. In addition, for each EVI, the PE device outputs an EVPN route advertising an Ethernet Auto-Discovery (AD) route specifying the relevant ESI for the Ethernet segment for the EVI. Once the EVPN is operational for the {EVI, ESI} pair, PE devices 10A-10B output routing protocol messages to one another to announce media access control (MAC) addresses associated with devices of the customer network. The topology of network system 2 is an example. In some examples, the EVI 3 may include more or fewer (i.e., zero) multi-homed Ethernet segments.

For example, in typical operation, PE devices 10A-10B communicate using the Border Gateway Protocol (BGP) to transport BGP Network Layer Reachability Information (NLRI) for the EVPN and may define different EVPN route types for conveying EVPN information via the BGP routing protocol. The EVPN NLRI is typically carried in BGP using BGP Multiprotocol Extensions. An Ethernet Segment route advertised by each PE device 10A-10D using BGP includes a Route Distinguisher and Ethernet Segment Identifier. An Ethernet AD route advertised by each PE device 10A-10B for each EVI, specifies a Route Distinguisher (RD) (which may include, e.g., an IP address of the PE), ESI, Ethernet Tag Identifier, and MPLS label. Subsequent BGP media access control (MAC) routes output by PE device 10A-10B announce MAC addresses of devices of customer network that communicate using the EVPN and include a RD, ESI, Ethernet Tag Identifier, MAC address and MAC address length, IP address and IP address length, and MPLS label.

In the example of FIG. 1, when providing the EVPN service to customer networks, PE devices 10 and CEs 8 perform MAC address learning to efficiently forward L2 network communications in network system 2. That is, as PE devices 10 and CEs 8 forward Ethernet frames, the routers learn L2 state information for the L2 network, including MAC addressing information for devices 4 within the network and the physical ports through which devices 4 are reachable. PE devices 10 and CE 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

Moreover, as PE devices 10 learn the MAC addresses for devices 4 reachable through local attachment circuits, the PE devices 10 use MAC address route advertisements of a layer three (L3) routing protocol (i.e., Multi-Protocol BGP (MP-BGP) in this example) to share the learned MAC addresses and to provide an indication that the MAC addresses are reachable through the particular PE device that is issuing the route advertisement. In the EVPN implemented using PE devices 10 for a given EVI, each of PE devices 10 advertises the locally learned MAC addresses to other PE devices 10 using a BGP route advertisement, also referred to herein as a "MAC route," "MAC Advertisement route," or "MAC/IP Advertisement." As further described below, a MAC route typically specifies an individual MAC address of devices 4 along with additional forwarding information, such as a route descriptor, route target, layer 2 segment identifier, MPLS label, etc. In this way, PE devices 10 use BGP to advertise and share the MAC addresses learned when forwarding layer two communications associated with the EVPN. Accordingly, PE devices 10 may perform both local learning and remote learning of MAC addresses.

Each of PE devices 10 uses MAC routes specifying the MAC addresses learned by other PE devices to determine how to forward L2 communications to MAC addresses that belong to devices connected to other PEs, i.e., to remote CEs and/or devices behind CEs operatively coupled to PE devices. That is, each of PE devices 10 determine whether Ethernet frames can be sent directly to a particular one of the other CE devices, PE devices 10 or whether to treat the Ethernet frames as so called "BUM" traffic (Broadcast, Unidentified unicast or Multicast traffic) that is to be flooded within the EVPN based on the MAC addresses learning information received from the other PE devices 10.

As shown in FIG. 1, CEs 8 are multi-homed to PE devices 10. In EVPN, a CE may be said to be multi-homed when it is coupled to two physically different PE devices on the same EVI when the PE devices are resident on the same physical Ethernet Segment. CE 8B is coupled to PE devices 10A and 10B via respective links 15A and 15B of Ethernet Segment 14B, where PE devices 10A and 10B are capable of providing access to EVPN for CE 8B. In this example, CE 8B is multi-homed to PE devices 10A and 10B because CE 8B is coupled to two different PE devices 10A and 10B via separate and, to a certain extent, redundant links 15A and 15B where both of PE devices 10A and 10B are capable of providing access to EVPN for L2 customer network 6B. Multi-homed networks are often employed by network operators so as to improve access to EVPN provided by service provider network 12 should a failure in one of links 15A and 15B occur. In a typical EVPN configuration, only the multi-homing PE devices 10A-10B participate in DF election for each ESI.

In an active-active EVPN mode of operation (sometimes referred to as all-active), all of the links 15A and 15B forming the Ethernet segment 14 (and thus the multi-homed connection) are considered active in that PE devices 10A, 10B are both configured to actively exchange data traffic with CE 8B via respective links 15A and 15B. In active-active mode, each of PE devices 12A and 12B may also be configured with (or derive) a common Ethernet segment identifier (ESI) for Ethernet segment 14. CE 8B may be configured with an aggregated Ethernet (ae) interface for a Link Aggregation Group (LAG) for links 15A and 15B of Ethernet segment 14B that CE 8B uses to reach PE devices 10A and 10B. CE 8B may be configured to load balance traffic to PE devices 10 among links 15. CE 8B may apply equal-cost multipath (ECMP) routing for links of the bundle, each of which may be configured with the same IP metric and cause CE 8B to perform the load balancing. The CE 8B may employ a local hashing function to map traffic flows onto links in the LAG.

An EVPN, such as EVI 3 illustrated in FIG. 1, may operate over a Multi-Protocol Label Switching (MPLS) configured network and use MPLS labels to forward network traffic accordingly. MPLS is a mechanism used to engineer traffic patterns within Internet Protocol (IP) networks according to the routing information maintained by the routers in the networks. By utilizing MPLS protocols, such as the Label Distribution protocol (LDP) or the Resource Reservation Protocol with Traffic Engineering extensions (RSVP-TE), a source device can request a path through a network to a destination device, i.e., a Label Switched Path (LSP). An LSP defines a distinct path through the network to carry MPLS packets from the source device to a destination device. Using a MPLS protocol, each router along an LSP allocates a label and propagates the label to the closest upstream router along the path. Routers along the path add or remote the labels and perform other MPLS operations to forward the MPLS packets along the established path.

As shown in the example of FIG. 1, intermediate network 12 may provide an MPLS core or IP tunneling infrastructure for sending network packets from CE 8A to and from CE 8B, which may include sending the network packets over a mesh of tunnels interconnecting PE device 10. Intermediate network 12 and EVPN instance 3 may include additional PE device 10. Each of PE devices 10A-10B implement the MPLS protocol and apply one or more MPLS labels, i.e., a label stack, to network packets in accordance with routing and forwarding information configured at each respective PE device. In an EVPN, a label stack applied to a network packet may include multiple labels. For instance, a label stack may include an outer label and an inner label.

The outer label serves as a "transport label" that uniquely identifies a PE device in an MPLS core. That is, each of PE devices 10A-10B may exchange control plane messages at configuration and startup that specify an outer label that uniquely identifies each respective PE device. For instance, PE device 10A may send control plane messages that specify an outer label that identifies PE device 10A to PE devices 10B-10B. PE devices 10B-10B may configure their respective forwarding units such that network packets that include the outer label corresponding to PE device 10A are forwarded to PE device 10A.

The inner label, or "service label," of the MPLS label stack provides EVPN-specific configuration information. As described above, EVPN defines Ethernet AD routes, MAC/IP advertisement routes, and Ethernet Segment routes, for instance. An Ethernet AD route, for example, may be structured according to the following format of Table 1:

TABLE 1

| AD route advertisement |
| --- |
| Route Distinguisher (8 octets) |
| Ethernet Segment Identifier (10 octets) |
| Ethernet Tag ID (4 octets) |
| MPLS Label (3 octets) |

In one example, PE device 10A may send an Ethernet AD route to PE device 10B initially at startup and configuration that includes an MPLS label as shown above. PE device 10C may configure one or more of its forwarding units to apply the MPLS label of the Ethernet AD route from PE device 10A as the inner label in a label stack applied to network packets that are destined to PE device 10A for forwarding via the network identified by the Ethernet segment and Ethernet Tag ID. PE device 10B would then apply a transport label for reaching PE device 10A as the outer label in the label stack. In this way, the inner label provides EVPN-specification configuration information about the Ethernet AD route that PE device 10B uses to forward network packets in the EVPN.

For example, PE device 10B may advertise an AD route for the Ethernet segment 14B to PE device 10A that indicate the PE device 10B provides L2 reachability for the Ethernet segment 14B. PE device 10A may likewise advertise a similar AD route for the same Ethernet segment 14B.

In some configurations, to provide flexibility and scalability, multiple bridge domains can be defined for a particular EVPN instance (EVI). One or more EVIs can be associated with a single L3 VPN virtual routing and forwarding instance (VRF). For example, each customer of the service provider network (or data center tenant) may be assigned a unique VRF; a customer/tenant can encompass one or more EVPN instances and one or more bridge domains (e.g., VLAN or VxLAN) per EVPN instance. To support this model, each configured bridge domain (including the default bridge domain for an EVPN instance) requires a IRB logical interface to perform the L2 and L3 functions. Each local bridge domain or local IRB interface for a PE device 10 may map to a unique IP subnet in the VRF for the PE device 10. IRB interfaces may be configured on each configured bridge domain including the default bridge domain for an EVPN instance.

In some examples, one or more of PE devices 10 may embed Network Virtualization Edge (NVE) functionality within the respective PEs, as described in "Network Virtualization Edge (NVE)," Feb. 13, 2014, https://tools.ietforg/html/draft-yong-nvo3-nve-03, which is hereby incorporated by reference herein in its entirety. In some examples, a PE that implements NVE functionality may be referred to as an NVE device.

As shown in FIG. 1, PE devices 10A-10B include respective VRFs 13A-13B ("VRFs 13") for the EVI 3. Generally, VRFs permits multiple routing tables to exist within a single physical router. An attachment circuit may be associated with a particular VRF, and the particular VRF may be configured to forward traffic for the attachment circuit. VRFs 13 may be configured to include functionality described in "BGP/MPLS IP Virtual Private Networks (VPNs)," February 2006, https://tools.ietforg/html/rfc4364, which is hereby incorporated by reference herein in its entirety.

As shown in FIG. 1, Virtual Local Area Networks (VLANs) may be configured for PE devices 10. Accordingly, PE devices 10 may forward network packets using the bridge domains defined by the VLANs. As shown in FIG. 1, PE devices 10A-10B are configured with VLANs instances 11A-11B, each of which represents a different bridge domain. Each instance may represent functionality implemented by the respective PE for forwarding network packets within one or more virtual layer 2 networks identified by a corresponding VLAN identifiers. VLAN 11B transported using Ethernet segment 14B may be a multicast VLAN (MVLAN) and, because EVPN is used to emulated LAN, may be referred to as an MVLAN. VLAN 11A transported by Ethernet segment 14A is an access LAN for CE 8A and devices, such as multicast source 9, that access intermediate network 12 via CE 8A.

PE devices 10 also implement integrated routing and bridging, which supports layer 2 bridging and layer 3 routing on the same interface. As such, integrated routing and bridging allows a router to route local packets to another routed interface or to another bridging domain that has a layer 3 protocol configured. Integrated Routing and Bridging (IRB) interfaces (or "IRBs") are logical interfaces that enable a PE or CE to recognize which packets are being sent to local addresses so that they are bridged whenever possible and are routed only when needed. Accordingly, IRBs may be used to locally route inter-subnet traffic. For instance, using one or more IRBs, a PE may route inter-subnet traffic between multiple VLANs configured for multiple IRBs for a routing instance of the PE.

In the example of FIG. 1, each of PE devices 10 is configured with a IRB 19 associated with a VRF 13 and having a VLAN-based bridging domain of a VLAN 11B. PE device 10A includes IRB 19A with the VLAN 11A bridging domain; PE device 10B includes IRB 19B with the VLAN 11A bridging domain. Similarly, each of PE devices 10 is configured with a IRB 21 associated with VRF 13 and having a VLAN-based bridging domain of a VLAN 11A. PE device 10A includes IRB 21A with the VLAN 11B bridging domain; PE device 10B includes IRB 21B with the VLAN 11B bridging domain.

IRBs 19 may serve as IP gateways for inter-subnet traffic for EVI 3. PE device 10A, e.g., may be configured with multiple IRBs associated with VRF 13A and having different VLAN-based bridging domains and, accordingly, may route traffic between the VLANs using the multiple IRBs. One or more of PE devices 10 may implement IRB as described in "Integrated Routing and Bridging in EVPN", ietf-bess-evpn-inter-subnet-forwarding, Oct. 18, 2015, https://tools.ietforg/html/draft-ietf-bess-evpn-inter-subnet-forwarding-01, which is hereby incorporated by reference herein in its entirety. VLAN 11A and VLAN 11B are virtual L2 networks for L3 subnets reachable via PE device 10A, 10B using EVPN.

CE 8B in this example may also be configured with an IRB having a bridging domain that provides L2 reachability to external devices including RP router 16. The IRB may be configured with a L3 address (e.g., an IPv4/IPv6 address) that is within the bridging domains for IRBs 19A, 19B, such that the IRB routing interface for CE 8B is reachable by the routing interfaces for IRBs 19A, 19B. In this way, the CE 8B IRB provides L2/L3 reachability from PE devices 10A, 10B.

In an EVPN instance, learning of layer 2 forwarding information (e.g., MAC learning) between PEs occurs not in the data plane (as happens with traditional bridging), but in the control plane. PE devices 10A, 10B can advertise the layer 2 addresses (e.g., MAC addresses) learned from the CEs 8A and 8B that are connected to them, along with an MPLS label, to other PEs in the control plane using a route advertisement, such as via Multiprotocol BGP (MP-BGP). As mentioned above, in an EVPN active-active multi-homing topology that implements integrated routing and bridging, any of the multi-homing PE devices 10A, 10B may learn L2-L3 (e.g., MAC/IP) bindings for locally connected hosts and advertise the L2-L3 bindings to other PE devices of the EVPN instance using EVPN routes, including to the peer multi-homing PE devices 10 for the Ethernet segment 14B, for instance.

PE devices 10, CE 8B, and RP router 16 are layer 3 multicast routers that execute one or more multicast control plane protocols, such as Protocol Independent Multicast (PIM)-Sparse Mode (PIM-SM), to exchange multicast information for building and modifying multicast distribution trees and forwarding multicast traffic.

PE devices 10, CE 8B, and RP router 16 may be routers of a PIM-SM domain. Routers of a PIM-SM domain use reverse-path forwarding (RPF) to create a path for a multicast group, G, from a multicast source 9 that sources the multicast traffic for the multicast group to the multicast receiver 7 requesting multicast traffic 26 for the multicast group. One or more additional routers, including the designated or last-hop router for receiver 7 may be located on a path from RP router 16 to receiver 7.

Receiver 7 initially issues an explicit multicast Join request, which triggers an RPF check. The designated router for receiver 7 sends a PIM (*, G) Join message to the RP router 16. Routers multicast the Join message hop by hop upstream to the ALL-PIM-ROUTERS group (224.0.0.13) by means of each router's RPF interface until the Join message reaches the RP router 16. The RP router 16 receives the PIM (*, G) Join message and adds the interface on which it was received to the outgoing interface list (OIL) of the rendez-vous-point tree (RPT) multicast forwarding state entry for (*, G). This process by the results in an RPT connecting the receiver 7 with the RP router 7. The RPT from RP router 16 to the designated router for receiver 7 remains in effect, even if no active sources generate traffic.

In general, multicast forwarding state for (*, G) or (S, G) entries is the information by routers used for forwarding unicast or multicast packets. S is the source IP address, G is the multicast group address, and * represents any source sending to multicast group G. Routers may keep track of the multicast forwarding state for the incoming and outgoing interfaces for each group. Multicast forwarding state for an entry stored by a router may specify an output interface of the router for multicast traffic matching the entry.

When multicast source 9 becomes active and outputting multicast traffic 26 for the multicast group, G, the designated router for source 9 may encapsulate multicast traffic 26 into PIM register messages and send the multicast traffic 26 by means of unicast to the RP router 16. The designated router for source 9 may be any router on a path from source 9 to RP router 16. The designated router for source 9 may also be RP router 16. In the example of FIG. 1, the designated router for source 9 is PE device 10B. In some examples, the designated router for source 9 may be CE 8A. The designated router for source 9 may or may not be the DF for segment 14B for EVI 3.

In some examples, including the example of FIG. 1, PE device 10B tunnels the PIM register messages in tunnel 18 to the RP router 16 to unicast the multicast traffic 26 to RP router 16. Tunnel 18 may represent a Generic Routing Encapulation (GRE), other IP tunnel, or other type of tunnel for unicasting multicast traffic 26 from PE device 10B to RP router 16. In some examples, RP router 16 removes the encapsulation from (or "decapsulates") multicast traffic 26, which may include at least one of tunnel 18 encapsulation and the PIM register message information, to obtain multicast traffic 16, which RP router 16 multicasts on the RPT for (*, G) from RP router 16 to interested multicast receiver 7.

RP router 16 has interested receiver 7 for multicast group G in the PIM-SM domain. Upon receiving the PIM register message including multicast traffic 26, RP router 16 therefore sends a PIM (S, G) Join message 22 toward the source 9 to build a shortest-path tree (SPT) back to the source 9, where S is the IP address of source 9 that RP router 16 received as the source address of the multicast traffic 26 received by RP router 16 in the one or more PIM register messages.

Per PIM-SM specification RFC 7761, in response to receiving Join message 22 from RP router 16 (or a corresponding Join message from an intermediate router between RP router 16 and CE 8B), CE 8B generates Join message 24 to include an upstream neighbor address field that specifies the target of the Join message 24. That is, the upstream neighbor address field identifies one of the PIM routers of the PIM domain that is to process the Join message 24. The target of the Join message 24 processes the Join message 24 to join the shortest path tree for distributing multicast traffic 26 for (S, G) to receiver 7. For each such Join message, CE 8B selects one of its upstream neighbors, that is, one of PE devices 10, and may load balance such joins among the upstream neighbors. In the example of FIG. 1, CE 8B has selected PE 10A for Join message 24 multicast on the RPF interface of CE 8B for source 9.

Join message 24 is multicast hop by hop upstream to the ALL-PIM-ROUTERS group (224.0.0.13). Because both PE devices 10 are on the RPF interface to source 9, i.e., S, each of PE devices 10A, 10B receives a copy of the Join message 24. Both PE device may be on the RPF interface to source 9 because links 15 may be aggregated links, e.g., an aggregate Ethernet interface or LAG.

Being the target of and identified by Join message 24, PE device 10A may therefore process Join message 24 and add multicast forwarding state for (S, G) specified in Join message 24. PE device 10A may send another (S, G) join message upstream toward CE 8A. PE device 10A is now a member of the SPT tree for (S, G) to multicast receiver 7. However, PE device 10A is not the DF for Ethernet segment 14B and is therefore prevented by EVPN operation for EVI 3 from sending any multicast traffic to CE 8B. As a result, a shortest-path tree from the designated router for source 9 to RP router 16 cannot be established via PE device 10A.

In accordance with techniques described herein, a PE device that is not identified as the target device for a multicast join message, e.g., having a network address specified in an upstream neighbor address field of a multicast join message, nevertheless processes the multicast join message to create and add multicast forwarding state for an (S, G) specified in the join message. For example, PE device 10B receives Join message 24 that is targeted to the peer multi-homing PE device 10A for Ethernet segment 14B with CE 8B. PE device 10B processes the Join message 24 to create and add multicast forwarding state for the (S, G) specified in Join message 24, where the added multicast forwarding state enables the PE device 10B to forward multicast traffic 26 output by S for (S, G) along a shortest-path tree from the designated router for source 9 to the RP router 16.

PE device 10B may additionally send a multicast join message corresponding to Join message 24 on the RPF interface to CE 8A. Source 9 outputs multicast traffic 26 to its designated router, which sends the traffic down the shortest-path tree that includes PE device 10B and RP router 16. CE 8A sends the multicast traffic 26 to PE device 10B via link 17B. CE 8A may additionally output multicast traffic 26 to PE device 10A that also processed Join message 24. However, PE device 10A is not the designated forwarder for EVI 3 for Ethernet segment 14B.

PE device 10B receives and forwards the multicast traffic 26 using the forwarding state for (S, G) generated by PE device 10B in response to receiving the Join message 24. That is, PE device 10B forwards the multicast traffic 26 along the shortest-path tree to RP router 16, which receives the multicast traffic 26 along the shortest-path tree in addition to or alternatively to receiving the multicast traffic 26 encapsulated in PIM register messages, e.g., via tunnel 18.

As noted above, in some examples PE device 10B is a designated router for source 9. Once RP router 16 receives multicast traffic 26 via the shortest-path tree, i.e., rather than or in addition to multicast traffic 26 encapsulated in PIM Register messages, RP router 16 may discard the encapsulated copies of multicast traffic 26, and RP router 16 may send a PIM Register-Stop message back to PE device 10B operating as the designated router of source S to prevent PE device 10B from unnecessarily encapsulating the packets. PE device 10B, in response to the PIM Register-Stop message, may delete the interface for tunnel 18 and no longer use tunnel 18 for multicast traffic 26 for (S, G).

Figure 2:
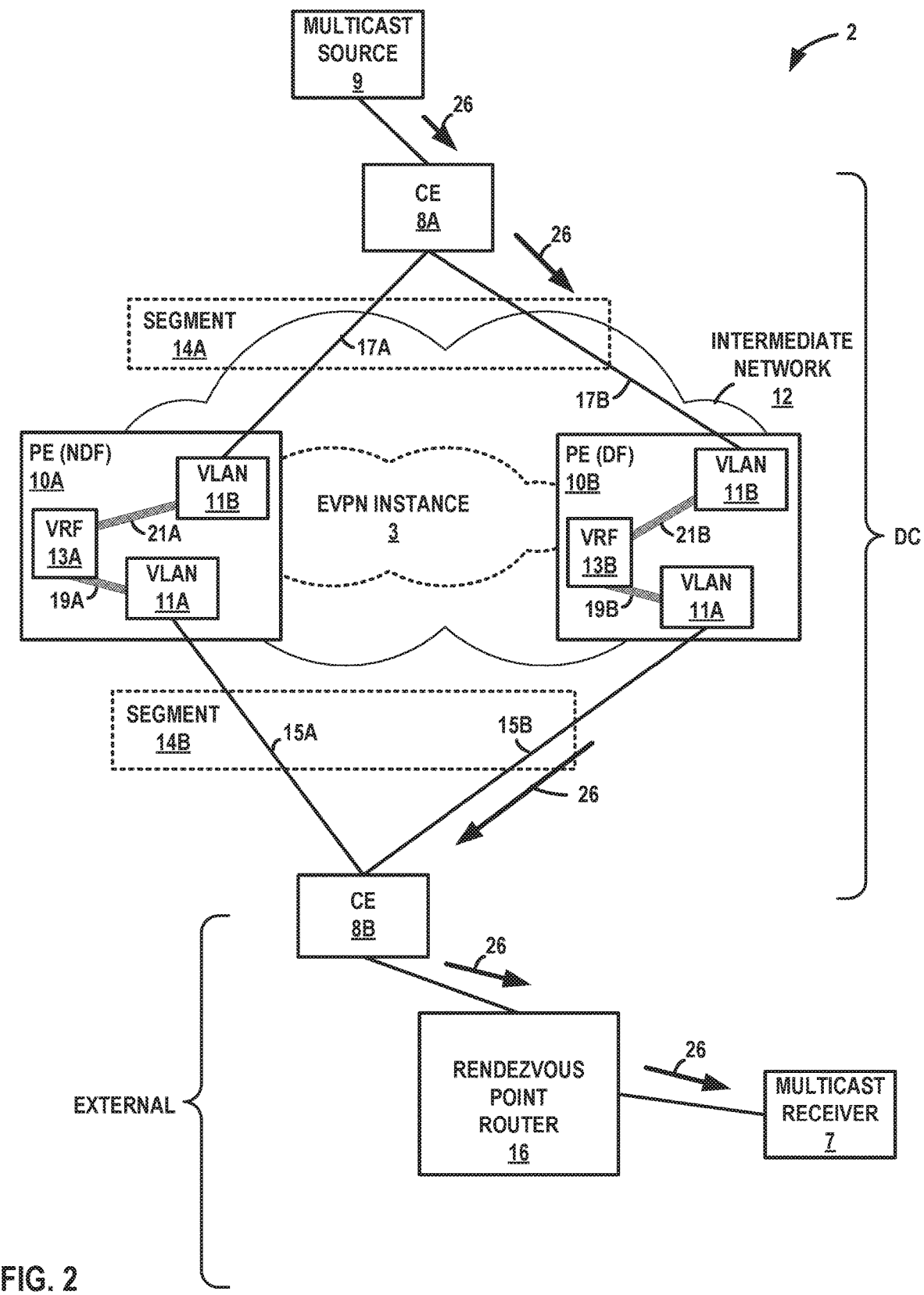
FIG. 2 is a block diagram illustrating an example system, in accordance with techniques of the disclosure.

FIG. 2 is a block diagram illustrating the network system 2 of FIG. 1, in accordance with techniques described herein. FIG. 2 illustrates that PE device 10B uses the shortest-path tree generated as a result of the join messages 22, 24, to forward multicast traffic 26. PE device 10B receives multicast traffic 26 from CE 8A; PE device 10B is a designated router for EVI 3 for Ethernet segment 14B and is thus able to forward the multicast traffic 26 on the Ethernet segment 14B to CE 8B, which forwards the multicast traffic 26 toward the RP router 16, which forwards the multicast traffic 26 via the RPT to multicast receiver 7.

In some cases, the PIM domain of network system 2 perform shortest-path tree switchover from the RPT from the RP router 16 to the designated router of the multicast receiver 7. In such cases, once the receiver's designated router (not shown) receives the first multicast packet 26 from the source 9, the designated router sends a multicast join message, e.g., a PIM join message, to its RPF neighbor toward source 9. This continues until each RPF neighbor toward source 9 receives a join message, which is finally received by the designated router for source 9. In some cases, RP router 16 is not on the reverse path and therefore not on the shortest-path tree from the designated router for source 9 to the designated router for receiver 7. PE device 10B receives the join message and is, at least in some cases, the designated router for source 9. PE device 10B, in response to receiving the join message, processes the join message to create additional (S, G) state to form the shortest-path tree. The join message received by PE device 10B for performing SPT switchover may be similar to Join message 24 received by PE device 10A identified by Join message 24. For example, the join message may include an upstream neighbor address field having a value set to a network address of PE device 10A. Nevertheless, PE device 10B processes the join message to create the additional (S, G) state to form the shortest-path tree.

Source 9 outputs multicast traffic 26, which are received by PE device 10B and output on an interface of the PE device 10B to CE 8B based on the additional (S, G) state for the shortest-path tree. The designated router for receiver 7 may now be receiving two copies of each multicast packet of multicast traffic 26 sent by the source—one from the RPT from RP router 16 and one from the new shortest-path tree. To stop duplicate multicast packets, the designated router for receiver 7 sends a multicast prune message, e.g., a PIM (S, G) prune message, toward the RP router 16. The RP router 16 receives the prune message and stops sending multicast packets down to the receiver's DR on the RPT. The designated router for receiver 7 may be receiving multicast packets only for this particular source 9 over the new shortest-path tree.

However, in cases where the RP router 16 is not a member of the new shortest-path tree multicast packets from the source 9 may nevertheless still be arriving from PE device 10B, as the designated router for the source 9, at the RP router 16. To stop the unneeded multicast packets from this particular source 9, the RP router 16 may send a multicast prune message, e.g., a PIM (S, G) prune message, to the designated router for the source 9. The designated router, PE device 10B, removes the (S, G) forwarding state associated with the interface toward the RP router 16 (again, in cases where the RP router is not a member of the new shortest-path tree) and continues to send multicast traffic 26 toward the designated router for the receiver 7 on the new shortest-path tree to which the PIM domain has switchover.

The techniques described herein may provide one or more advantages. For example, the techniques may enable routers of the PIM domain to forward multicast traffic 26 along a shortest-path tree from the designated router (e.g., PE device 10B) for the multicast source 9 to the RP router 16. This may cause the RP router 16 to send a PIM Register-Stop message and enable PE device 10B to discontinue using the PIM Register messages to send the multicast traffic 26 to the RP router 16, which may eliminate the need for a tunnel 18 from the multi-homing PE device 10B to the RP router 16. Because such tunnels are resource-intensive and inject significant latency into multicast traffic delivery, the techniques may reduce resource utilization and multicast traffic latency from the multicast source 9 to the multicast receiver 7. In addition, the techniques may enable the routers of the multicast (e.g., PIM) domain to perform shortest-path tree switchover. Switching to receive the traffic on the shortest-path tree in this way may further reduce latency of the multicast traffic 26 by eliminating reliance on the RPT from RP router 16 toward receiver 7.

Figure 3:
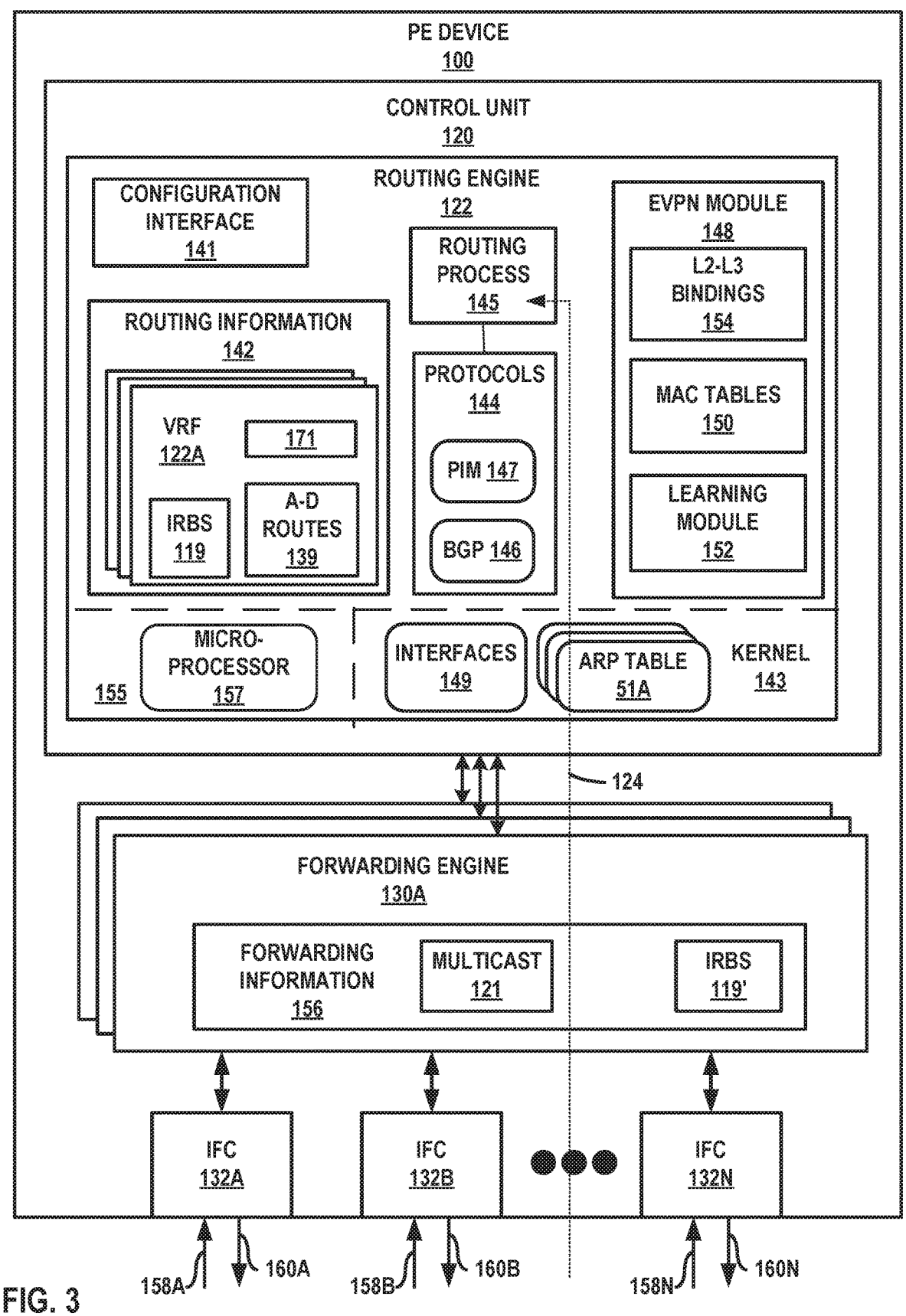
FIG. 3 is a block diagram illustrated a provider edge device, in accordance with techniques of the disclosure.

FIG. 3 is a block diagram illustrating further details of a network device processes multicast Join messages, in accordance with techniques of the disclosure. PE device 100 may represent an example instance of PE device 10B of FIGS. 1-2. PE device 100 includes a control unit 120 that includes a routing engine 122, and control unit 120 is coupled to forwarding engines 130A-130N. Each of forwarding engines 130 is associated with one or more interface cards 132A-132N ("IFCs 132") that receive packets via inbound links 158A-158N ("inbound links 158") and send packets via outbound links 160A-160N ("outbound links 160"). IFCs 132 are typically coupled to links 158, 160 via a number of interface ports (not shown). Inbound links 158 and outbound links 160 may represent physical interfaces, logical interfaces, or some combination thereof.

Elements of control unit 120 and forwarding engines 130 may be implemented solely in software, or hardware, or may be implemented as combinations of software, hardware, or firmware. For example, control unit 20 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 120 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE device 100, e.g., protocols, processes, and modules. Control unit 120, in some examples, retrieves and executes the instructions from memory for these aspects.

Routing engine 122 includes kernel 143, which provides a run-time operating environment for user-level processes. Kernel 143 may represent, for example, a UNIX operating system derivative such as Linux or Berkeley Software Distribution (BSD). Kernel 143 offers libraries and drivers by which user-level processes may interact with the underlying system. Hardware environment 155 of routing engine 122 includes microprocessor 157 that executes program instructions loaded into a main memory (not shown in FIG. 3) from a storage device (also not shown in FIG. 3) in order to execute the software stack, including both kernel 143 and processes executing on the operating environment provided by kernel 143. Microprocessor 157 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 143 provides an operating environment for a routing process 145 that executes various protocols 144 at different layers of a network stack, including protocols for implementing Ethernet Virtual Private Networks. For example, routing engine 122 includes network protocols that operate at a network layer of the network stack. In the example of FIG. 3, network protocols include the Border Gateway Protocol (BGP) 146, which is a routing protocol, and Protocol Independent Multicast (PIM) 147. BGP 146 may include Multiprotocol BGP (MP-BGP). Routing engine 122 may include other protocols not shown in FIG. 3, such as an MPLS label distribution protocol and/or other MPLS protocols. Routing engine 122 is responsible for the maintenance of routing information 142 to reflect the current topology of a network and other network entities to which PE device 100 is connected. In particular, routing protocols periodically update routing information 142 to accurately reflect the topology of the network and other entities based on routing protocol messages received by PE device 100.

As shown in FIG. 3, PE device 100 may be configured with multiple VRFs including VRF 122A. VRF 122A represents a virtual routing and forwarding instance. VRF 122A includes at least one routing table for BGP 46. An attachment circuit may be associated with a particular VRF, such as VRF 122A, and the particular VRF may be configured to forward traffic for the attachment circuit. VRF 122A is configured with an EVI for an Ethernet segment multi-homed by PE device 100 and at least one other PE device. PE device 100 may participate in designated forwarder elections for the EVI and be elected designated forwarder for the EVI.

Forwarding engines 130A-130N ("forwarding engines 130" or "forwarding units") represent hardware and logic functions that provide high-speed forwarding of network traffic. Forwarding engines 130 typically includes a set of one or more forwarding chips programmed with forwarding information that maps network destinations with specific next hops and the corresponding output interface ports. In general, when PE device 100 receives a packet via one of inbound links 158, one of forwarding engines 130 identifies an associated next hop for the data packet by traversing the programmed forwarding information based on information within the packet. One of forwarding engines 130 (either the ingress forwarding engine or a different egress forwarding engine) forwards the packet on one of outbound links 60 mapped to the corresponding next hop. Kernel 143 may generate forwarding information 56 to include representations of information stored to VRFs 122, interfaces 149, and ARP tables 151, in the form of forwarding information for optimized forwarding by forwarding engines 130.

In the example of FIG. 3, forwarding engine 130A includes forwarding information 156. In accordance with routing information 142, forwarding engine 130A stores forwarding information 156 that maps packet field values to network destinations with specific next hops and corresponding outbound interface ports. For example, routing engine 122 analyzes routing information 142 and generates forwarding information 56 in accordance with routing information 142. Forwarding information 156 may be maintained in the form of one or more tables, link lists, radix trees, databases, flat files, or any other data structures.

Forwarding engine 130A stores forwarding information 156 for each Ethernet VPN Instance (EVI) established by PE device 100 to associate network destinations with specific next hops and the corresponding interface ports. As described in FIG. 1, an EVI may be associated with one or more Ethernet segments in an EVPN. In general, when PE device 100 receives a data packet from a given Ethernet segment via one of inbound links 158, forwarding engine 130A, for example, identifies an associated next hop for the data packet by traversing forwarding information 156 based on information (e.g., labeling or header information) within the packet. Forwarding engine 130A forwards the data packet on one of outbound links 160 to the corresponding next hop in accordance with forwarding information 156 associated with the Ethernet segment. At this time, forwarding engine 130A may push and/or pop labels from the packet to forward the packet along a correct LSP.

Routing engine 122 includes a configuration interface 141 that receives and may report configuration data for PE device 100. Configuration interface 141 may represent a command line interface; a graphical user interface; Simple Network Management Protocol (SNMP), Netconf, or another configuration protocol; or some combination of the above in some examples. Configuration interface 141 receives configuration data configuring the PE device 100 with VRFs 122, interfaces 149, and other constructs that at least partially define the operations for PE device 100.

Routing engine 122 also includes an EVPN module 148 having a learning module 152 that performs layer two (L2) learning. Learning module 152 may perform remote learning using BGP 146. EVPN module 148 may maintain MAC tables 150 for each EVI configured in PE device 100, or in alternative examples may maintain one or more MAC tables 150 that are independent of each respective EVI. One of MAC tables 150, for instance, may represent a virtual routing and forwarding table of VRFs 122A for an EVI configured for VRF 122A and for which one or more of IRBs 119 is a routing interface. Learning module 152 may alternatively be configured for execution, in full or in part, by forwarding engine 130A. In some examples, EVPN module 148 may be part of or executed by routing process 145.

Learning module 152 may perform local L2/L3 (e.g., MAC/IP) binding learning by, e.g., using MAC and IP address information received by PE device 100 in ARP or NDP messages. Learning module 152 may detect a new MAC address on an EVI access interface (e.g., link 15A of FIG. 1) for an EVI and add the MAC address, with a mapping to the EVI access interface, to one of the MAC tables 150 for the EVI. Learning module 152 may then advertise an EVPN MAC/IP advertisement route using BGP 146 to remote PEs for the EVI. The MAC advertisement route may include a route target corresponding to the EVI, the MAC address, the Ethernet tag for the bridge domain in which the MAC address was learned, the ESI in which the MAC address was learned, the IP address corresponding to the MAC address (if known and if an IRB is configured for the bridge domain, e.g., one of IRBs 119), and an EVPN label. With remote MAC learning, learning module 152 may receive an EVPN MAC/IP advertisement route from another PE and install a host route for the IP address (if included) with protocol type EVPN to the appropriate VRF 122 for the EVI and install the MAC address in the MAC table 150 of the EVI, as well as the MAC information associated with the host route in the VRF 122 including the EVPN label.

EVPN module 148 may maintain one or more L2 address-L3 address (L2-L3) bindings 154 received and learned from peer PE devices (e.g., 10A of FIGS. 1-2) for the EVI via BGP 146. Each L2-L3 binding 154 can map an L3 address for a host connected to the peer PE device via an Ethernet segment to an L2 address for the host. For example, a L2-L3 binding 154 may map an IP address configured for customer device 4C connected to PE device 100 via the Ethernet segment 14 to a MAC address configured for customer device 4C. In some examples, L2-L3 bindings 154 may be stored in a distinct binding table or other data structure. In some examples, L2-L3 bindings 154 may be stored in ARP (or NDP) tables 151. In some examples, L2-L3 bindings 154 may be stored as routing advertisements generated by PE device 100 using information from ARP tables 151 or received from other PE devices for an EVI.

Routing process 145 outputs control-plane messages to automatically establish tunnels such as LSPs, Ethernet Segments, and otherwise provision one or more EVPNs between PE device 100 and each of the other PE devices participating in the EVPNs. Routing process 145 may signal the PE devices using one or more suitable L3 protocols, such as BGP 146. Routing process 145 can communicate with forwarding engine 130A to automatically update forwarding information 156.

EVPN module 148 additionally manages the EVPN multi-homing mode of operation for PE device 100. That is, EVPN module 148 operates to maintain EVPN service and traffic forwarding to and from CEs multi-homed to PE device 100 and one or more other PE devices. For example, in the event of a network failure such as a PE device 100 to CE 8 link 15B failure; a failure of any of the PE devices; or an MPLS-reachability or other type of tunneling failure between any of the PE devices; EVPN module 148 coordinates with the other PE devices to ensure that the PE devices continue to operate in an active-active redundancy mode, and rapidly converge to a state of having the same topological information about the network in which the PEs operate (i.e., network convergence).

VRF 122A is further configured with IRBs 119, the logical interfaces for which are installed (or "configured") to forwarding information 156 of forwarding engine 130A. Kernel 143 includes an interfaces table 149 ("interfaces 149") that represents a data structure that includes a corresponding entry for each logical interface configured for PE device 100. Interfaces 149 includes an entry for IRB 119. Entries for respective logical interfaces may specify respective current information describing the logical interfaces. Kernel 143 also executes ARP and/or NDP to generate and inject an ARP request and/or NDP neighbor solicitation into the data plane for output via IFCs 132, as well as receive ARP and/or NDP messages. VRF 122A stores EVPN A-D routes 139 (i.e., EVPN Route Type 1) and EVPN MAC/IP advertisement routes 171 (i.e., EVPN Route Type 2) receives by routing process 145 in BGP messages from other PE devices or generated by routing process 145 using locally-learned information.

PE device 100 receives a PIM (S, G) Join message 124 at one of IFCs 132. Message 124 may be an example instance of multicast Join message 24 of FIG. 1. The message 124 may be received by PE device 100 via a bridge domain that is associated with the EVI configured in VRF 122A. IFCs 132 stores the message 124 to a memory accessible to routing engine 122. Although PE device 100 is not identified by and is not the target of message 124, routing process 145 processes the message 124 to add multicast forwarding state for (S, G) for multicast forwarding information 121 of forwarding information 156. The multicast forwarding information 121 may be associated with the EVI configured in VRF 122A and so be applied to EVPN traffic for the EVI, such as multicast traffic for (S, G). As a result, forwarding engine 130A forwards multicast traffic for (S, G), the multicast traffic received via a bridge domain associated with the EVI configured in VRF 122A, in accordance with the multicast forwarding information 121 on an Ethernet segment.

Figure 4:
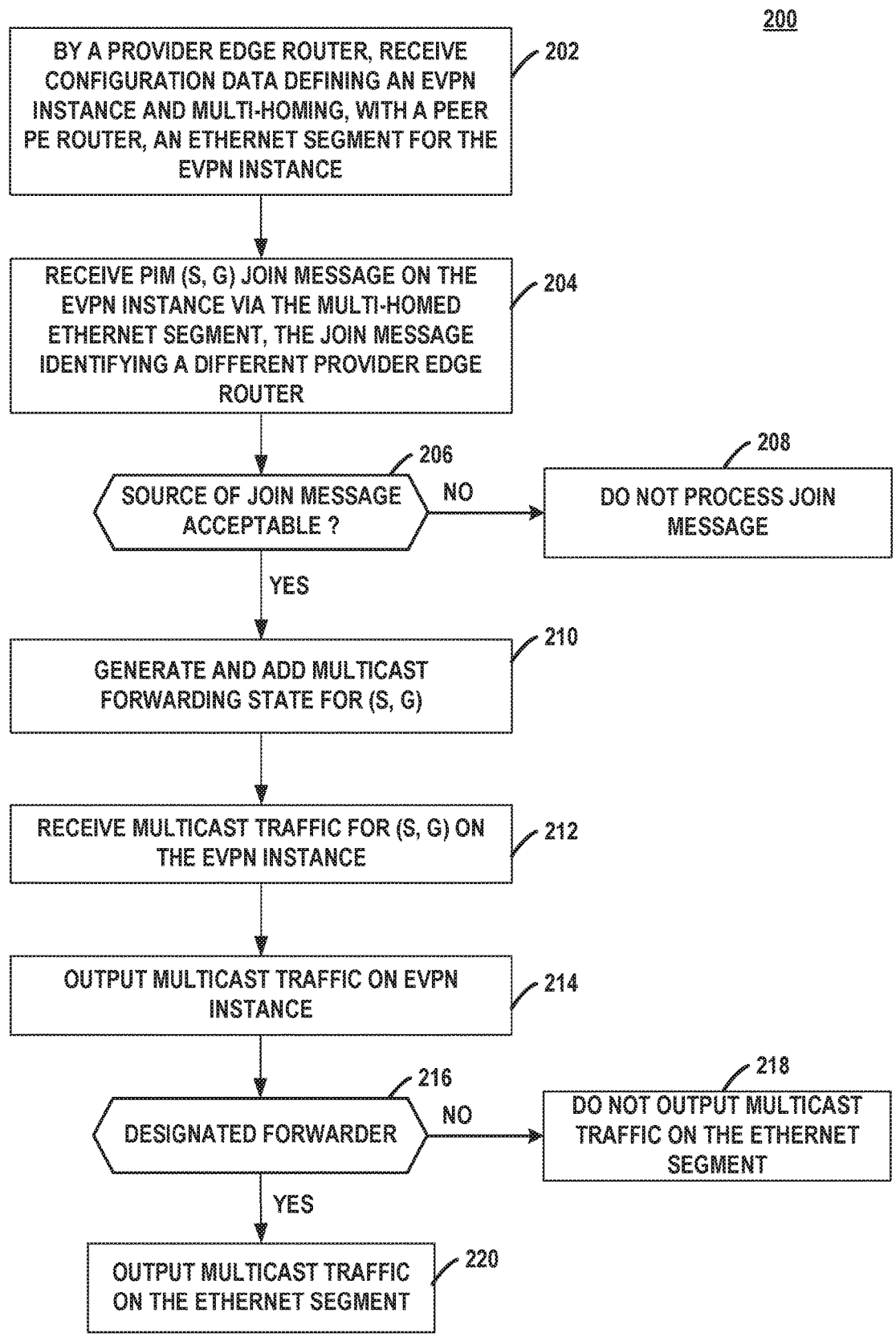
FIG. 4 is a flowchart illustrating an example mode of operation of a network device, according to techniques described in this disclosure.

FIG. 4 is a flowchart illustrating an example mode of operation of a network device, according to techniques described in this disclosure. Operation 200 is described with respect to PE device 100 deployed as PE device 10B but may be performed by any PE network device. PE device 100 receives configuration data defining an Ethernet segment 14B for EVPN instance (EVI) 3 (102). The configuration data configures the PE device 100 to provide active-active multi-homing layer 2 virtual bridge connectivity, together with a peer multi-homing PE device 10B, to a CE 8B using the Ethernet segment 14B. For example, the configuration data configures the PE device 100 to multi-home CE 8B for the EVI 3 to PE devices 10A, 10B. EVI 3 configured for VRF 122A may have multiple associated IRBs, including IRBs 19B and 21B, such that IRBs 19A and 21B are configured as routing instances for EVI 3.

PE device 100 receives a PIM (S, G) join message 124 on the EVI 3, i.e., on a bridge domain, VLAN 11A, of link 15B of multi-homed Ethernet segment 14B, the bridge domain being configured for EVI 3 (204). Join message 124 identifies a different PE device than PE device 100. For example, Join message 124 may include an upstream neighbor address field that has a value other than a network address of PE device 100 to identify the different PE device. A Join message that includes an upstream neighbor address field that has a value that identifies a network device is said to be "targeted to" the network device. In other words, the network device is the target of the Join message.

PE device 100 may determine whether the source PIM router for the Join message 124 is acceptable (206). In some instances, PE device 100 receives additional configuration data specifying a list of one or more acceptable sources for Join message 24. PE device 100 may receive the configuration data via configuration interface 141 and store the configuration data to a configuration database or other data structure of control unit 120. The configuration data may further specify an interface-level policy directing the PE device 100 to accept a PIM Join message received on the interface for the bridge domain of Ethernet segment 14B for EVI 3 only if the source of the PIM Join message is one of the list of acceptable sources. As a result, PE device 100 will not accept PIM Join messages from sources that are not one of the list of acceptable sources. The acceptable sources may be specified by one or more prefixes. The following is an example of configuration data for the network system 2 to implement that above-described source filtering for PIM Join messages:

```
prefix-list dstream-nbr-list{
    1.1.1.1/32; // CE 8B
}
policy-statement accept-join-always-policy {
    from {
        prefix-list dstream-nbr-list;
    }
    then accept;
}
Protocols {
    pim {
        interface irb.750 { // IRB 19B
            accept-join-always policy accept-join-always-policy;
        }
    }
}
```

The above configuration data causes PE device 100 operating as PE 10B to apply the accept-join-always-policy to PIM ("pim") traffic received on the IRB 19B having VLAN 11A for link 15B as a bridge domain. If the PIM traffic, e.g., Join message 124 is from CE 8B (having IP address 1.1.1.1/32 and thus a member of that /32 prefix), then the source of Join message 124 is acceptable (YES branch of 206), and PE device 100 accepts the Join message 124 and processes it. Otherwise (NO branch of 206), the PE device 100 rejects the Join message 124 and does not process it (208). PE device 100 may consequently avoid accepting Join messages from other PE devices 10 participating in the EVI 3 or other non-specified routers on the L2 network, e.g., VLAN 11A.

PE device 100 processes the Join message 124 to generate and add multicast forwarding state for (S, G) (210). PE device 100 may cease unicasting multicast traffic 26 for Gin PIM register messages to RP router 16. PE device 100 may be the designated router for source 9. PE device 100 may delete a tunnel interface for unicasting such multicast traffic 26 to RP router 16.

PE device 100 subsequently receives multicast traffic 26 for (S, G) on the EVPN instance (212). PE device 100 applies the multicast forwarding state added in step 210 to output the multicast traffic on VLAN 11A for the EVI 3 (214). If PE device 100 is the DF for EVI 3 for Ethernet segment 14B (YES branch of 216), as in the example of FIGS. 1-2, PE device outputs the multicast traffic on Ethernet segment 14B (220).

If PE device 100 is not the DF for EVI 3 for Ethernet segment 14B (NO branch of 216), PE device 100 does not output the multicast traffic on Ethernet segment 14B (218). However, PE device 100 may output the multicast traffic on the EVPN core connecting PE device 100 to the DF PE device, which then applies similar multicast forwarding state as added in step 210 to output the multicast traffic on the Ethernet segment 14B. In this way, the techniques facilitate consistent multicasting in an EVPN context even if PE device 100 loses the DF designation or is otherwise not the DF but is the only one of PEs 10 to receive multicast traffic 26 from CE 8A. The EVPN core may refer to the interconnecting mesh of tunnels connecting a plurality of PE devices 10 over an intermediate layer 3 network.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

What is claimed is:

1. A method comprising:
receiving, by a first provider edge (PE) device of a layer 3 network, configuration data configuring the first PE device to provide, via an Ethernet segment with an edge device, active-active multi-homing layer 2 (L2) virtual bridge connectivity to the edge device using an Ethernet Virtual Private Network (EVPN) instance;
receiving, by the first PE device, a multicast Join message for multicast traffic, the multicast Join message identifying a second PE device that also participates in the EVPN instance, wherein the first PE device is not specified as an upstream neighbor in the multicast Join message;
processing, by the first PE device, the multicast Join message to generate multicast forwarding state; and
forwarding, by the first PE device based at least on the multicast forwarding state, the multicast traffic.

2. The method of claim 1, further comprising:
applying, by the first PE device based at least on a protocol for the multicast Join message, a policy that specifies one or more acceptable source devices for the protocol; and
accepting and processing, by the first PE device, the multicast Join message in response to determining a source device for the multicast Join message is one of the one more acceptable source devices for the protocol.

3. The method of claim 1, wherein the multicast Join message comprises an upstream neighbor address field that does not have a value of a network address of the first PE device.

4. The method of claim 1, wherein forwarding the multicast traffic comprises forwarding, by the first PE device in response to determining the first PE device is a designated forwarder for the EVPN instance for the Ethernet segment, the multicast traffic on the Ethernet segment to the edge device.

5. The method of claim 1, wherein forwarding the multicast traffic comprises forwarding, by the first PE device, the multicast traffic to a third PE device that is a designated forwarder for the EVPN instance for the Ethernet segment.

6. The method of claim 1, further comprising:
prior to receiving the multicast Join message, sending, by the first PE device, the multicast traffic to a rendezvous-point (RP) router in Register messages;
after forwarding the multicast traffic based at least on the multicast forwarding state, receiving, by the first PE device, a Register-Stop message; and
reconfiguring, by the first PE device in response to receiving the Register-Stop message, the first PE device to no longer send the multicast traffic to the RP router in Register messages.

7. The method of claim 6, wherein the reconfiguring comprises deleting a tunnel interface for outputting the multicast traffic via a tunnel to the RP router.

8. The method of claim 6, wherein the first PE device is a designated router for a multicast source of the multicast traffic.

9. The method of claim 1, wherein the forwarding comprises forwarding, by the first PE device, the multicast traffic on a shortest-path tree from the first PE device to a rendezvous-point (RP) router.

10. The method of claim 1, wherein the forwarding comprises forwarding, by the first PE device, the multicast traffic on a shortest-path tree from the first PE device to a designated router for a multicast receiver for the multicast traffic, the method further comprising:
receiving, by the first PE device, a multicast Prune message for the multicast traffic;
by the first PE device in response to receiving the multicast Prune message, reconfiguring the first PE device to no longer forward the multicast traffic on an interface toward a rendezvous-point (RP) router.

11. The method of claim 1,
wherein the Join message is originated by a designated router of a multicast receiver for the multicast traffic, and
wherein the multicast forwarding state generated by processing the multicast Join message comprises multicast forwarding state for a shortest-path tree to the designated router of the multicast receiver.

12. A network device operable as a first provider edge (PE) device of a layer 3 network, comprising:
one or more processors operably coupled to a memory,
wherein the one or more processors are configured to receive configuration data configuring the first PE device to provide, via an Ethernet segment with an edge device, active-active multi-homing layer 2 (L2) virtual bridge connectivity to the edge device using an Ethernet Virtual Private Network (EVPN) instance,
wherein the one or more processors are configured to receive a multicast Join message for multicast traffic, the multicast Join message identifying a second PE device that also participates in the EVPN instance, wherein the first PE device is not specified as an upstream neighbor in the multicast Join message,
wherein the one or more processors are configured to process the multicast Join message to generate multicast forwarding state, and
wherein the one or more processors are configured to forward, based at least on the multicast forwarding state, the multicast traffic.

13. The network device of claim 12,
wherein the one or more processors are configured to apply, based at least on a protocol for the multicast Join message, a policy that specifies one or more acceptable source devices for the protocol, and
wherein the one or more processors are configured to accept and process the multicast Join message in response to determining a source device for the multicast Join message is one of the one or more acceptable source devices for the protocol.

14. The network device of claim 12, wherein the multicast Join message comprises an upstream neighbor address field that does not have a value of a network address of the first PE device.

15. The network device of claim 12, wherein the one or more processors are configured to forward, in response to a determination the first PE device is a designated forwarder for the EVPN instance for the Ethernet segment, the multicast traffic on the Ethernet segment to the edge device.

16. The network device of claim 12, wherein the one or more processors are configured to forward the multicast traffic to a third PE device that is a designated forwarder for the EVPN instance for the Ethernet segment.

17. The network device of claim 12, further comprising:
wherein the one or more processors are configured to, prior to receipt of the multicast Join message, send the multicast traffic to a rendezvous-point (RP) router in Register messages,
wherein the one or more processors are configured to, after forwarding the multicast traffic based at least on the multicast forwarding state, receive a Register-Stop message, and
wherein the one or more processors are configured to reconfigure, in response to receipt of the Register-Stop message, the first PE device to no longer send the multicast traffic to the RP router in Register messages.

18. The network device of claim 17, wherein the one or more processors are configured to delete a tunnel interface for outputting the multicast traffic via a tunnel to the RP router.

19. The network device of claim 17, wherein the first PE device is a designated router for a multicast source of the multicast traffic.

20. The network device of claim 12, wherein the one or more processors are configured to forward the multicast traffic on a shortest-path tree from the first PE device to a rendezvous-point (RP) router.

21. The network device of claim 12,
wherein the one or more processors are configured to forward the multicast traffic on a shortest-path tree from the first PE device to a designated router for a multicast receiver for the multicast traffic,
wherein the one or more processors are configured to receive a multicast Prune message for the multicast traffic;
wherein the one or more processors are configured to, in response to receipt of the multicast Prune message, reconfigure the first PE device to no longer forward the multicast traffic on an interface toward a rendezvous-point (RP) router.

22. The network device of claim 12,
wherein the Join message is originated by a designated router of a multicast receiver for the multicast traffic, and
wherein the multicast forwarding state generated by processing the multicast Join message comprises multicast forwarding state for a shortest-path tree to the designated router of the multicast receiver.

23. A non-transitory computer-readable medium comprising instructions for causing one or more programmable processors of a provider edge (PE) device of a layer 3 network to:
receive configuration data configuring the PE device to provide, via an Ethernet segment with an edge device, active-active multi-homing layer 2 (L2) virtual bridge connectivity to the edge device using an Ethernet Virtual Private Network (EVPN) instance;
receive a multicast Join message for multicast traffic, the multicast Join message identifying a different PE device that also participates in the EVPN instance;
process the multicast Join message to generate multicast forwarding state; and
forward, based at least on the multicast forwarding state, the multicast traffic.

24. The method of claim 1, wherein the multicast Join message comprises a Protocol Independent Multicast Join message.

25. The network device of claim 12, wherein the multicast Join message comprises a Protocol Independent Multicast Join message.

26. The computer-readable medium of claim 23, wherein the multicast Join message comprises a Protocol Independent Multicast Join message.

* * * * *